April 16, 1963  H. T. ROBINSON  3,085,471
AUTOMATIC REPEATER SLIDE PROJECTOR
Filed Nov. 2, 1959  3 Sheets-Sheet 1

HERBERT T. ROBINSON
INVENTOR.

BY
ATTORNEYS

April 16, 1963    H. T. ROBINSON    3,085,471
AUTOMATIC REPEATER SLIDE PROJECTOR
Filed Nov. 2, 1959    3 Sheets-Sheet 2

HERBERT T. ROBINSON
INVENTOR.

BY
ATTORNEYS

April 16, 1963     H. T. ROBINSON     3,085,471
AUTOMATIC REPEATER SLIDE PROJECTOR
Filed Nov. 2, 1959     3 Sheets-Sheet 3

HERBERT T. ROBINSON
INVENTOR.

BY *R. Frank Smith*
*Steve W. Grenban*
ATTORNEYS

United States Patent Office 3,085,471
Patented Apr. 16, 1963

3,085,471
AUTOMATIC REPEATER SLIDE PROJECTOR
Herbert T. Robinson, Rochester, N.Y., assignor to Eastman Kodak Company, Rochester, N.Y., a corporation of New Jersey
Filed Nov. 2, 1959, Ser. No. 850,213
10 Claims. (Cl. 88—28)

This invention relates generally to slide projectors, and more specifically to an improved slide projector adapted to automatically return the slide magazine to its original starting position after all of the slides in the magazine have been projected.

All of the automatic slide projectors that applicant is aware of are adapted to automatically advance the slide magazine one slide interval at a time, until all of the slides have been projected. When the last slide in the magazine has been projected and returned into its slide compartment, if the operator desires to project the same slides once again, it is necessary for him to either remove the slide magazine manually and reinsert it into the projector, or manually return the magazine back to its original starting position. This is disadvantageous in that it necessitates manual manipulation of the slide magazine by the operator and additionally is objectionable from the standpoint that the operator by manually manipulating the magazine may jam the projector or damage it. It is therefore the primary object of this invention to obviate all such disadvantages of prior known automatic slide projectors.

Another object of this invention is to provide an improved automatic slide projector having means for automatically returning the slide magazine to its original starting position after the last slide in the magazine has been projected and returned to its slide compartment.

Still another object of this invention is the provision of an improved automatic slide projector having an interlocking system for preventing operation of the projector mechanism while the slide magazine is being returned to its original starting position.

A further object of the invention is to provide an improved automatic slide projector in which the slide magazine will not return to its original starting position until the slide pick-up mechanism is clear of the slide tray and magazine.

Another object of the invention is the provision of an improved automatic slide projector that will automatically advance the slide magazine one slide at a time until all of the slides have been run through the projector, return the slide magazine to its original starting position and again advance the slide magazine one slide at a time and continue this sequence as long as the operator desires.

Another object of this invention is to provide an improved automatic slide projector that is of simple design and construction, thoroughly reliable and efficient in operation and economical to manufacture.

Objects and advantages other than those set forth above will be apparent from the following description when read in connection with the accompanying drawing, in which.

This invention relates to an improvement in an automatic slide projector of the type disclosed in U.S. patent application Serial No. 696,516, Patent No. 2,969,711, issued January 31, 1961, in which the present inventor is one of the coinventors. Since the general features of the projector are described in detail in the above-identified application, only general reference will be made to the structure of the projector that is not specifically connected to applicant's improvement.

Figure 1:
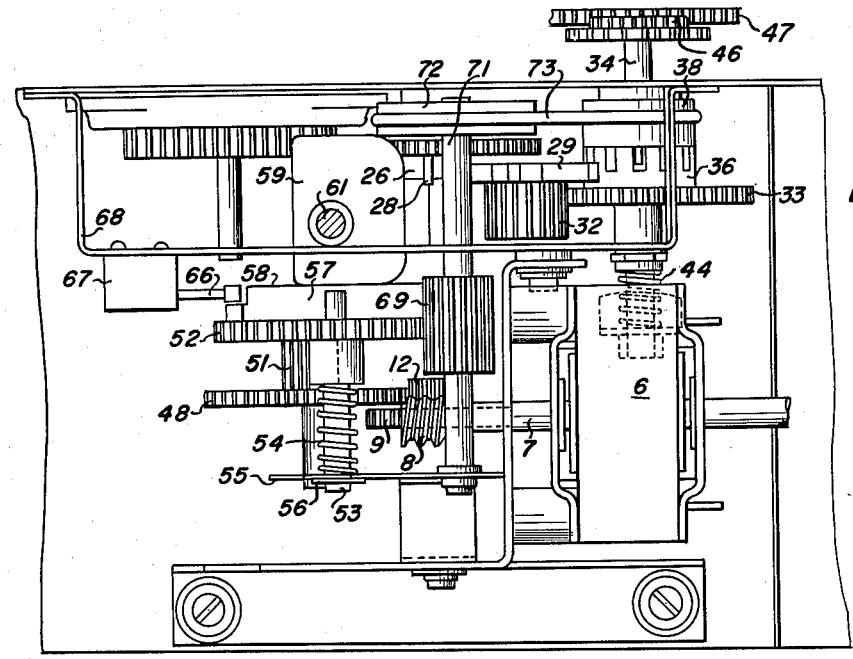
FIG. 1 is a fragmentary top plan view of an automatic slide projector showing the automatic timing selector, and the motor drive gear train for advancing and returning a slide magazine, not shown.
Figure 2:
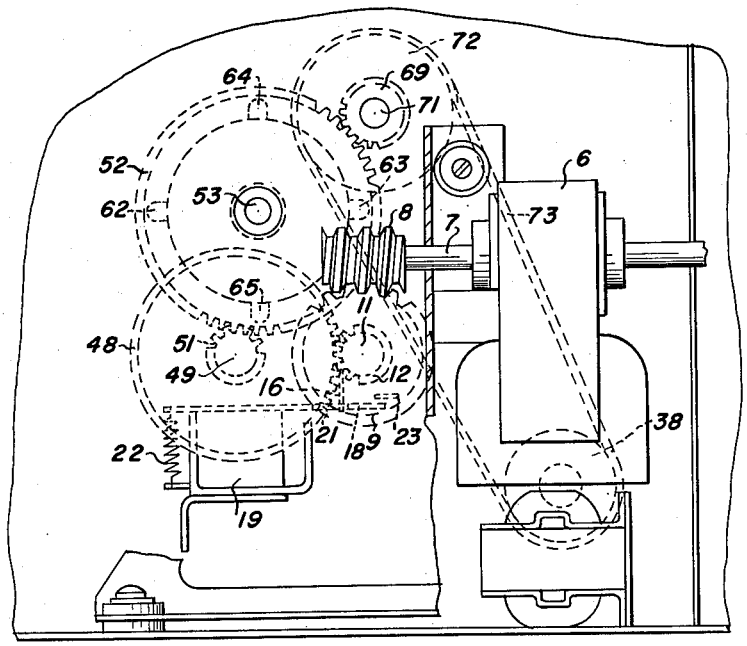
FIG. 2 is a front elevation view of the structure of FIG. 1.
Figure 3:
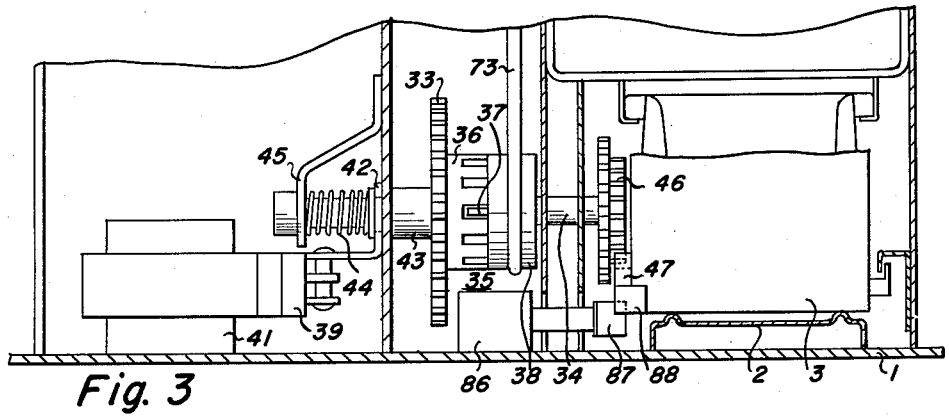
FIG. 3 is a fragmentary side elevation view of the structure of FIG. 1 showing the clutch in an operative position drivingly connecting the drive motor to the drive gear for advancing a slide magazine, and additionally showing the slide magazine on a track.
Figure 6:
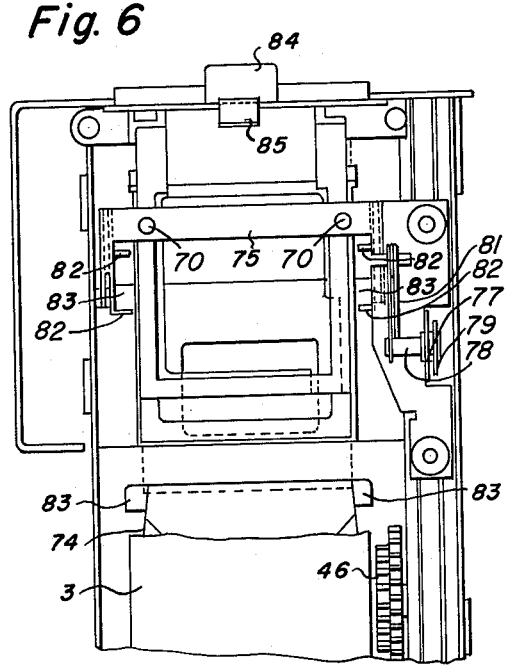
FIG. 6 is a fragmentary front elevation view of the slide gate and elevation mechanism of this projector.
Figure 7:
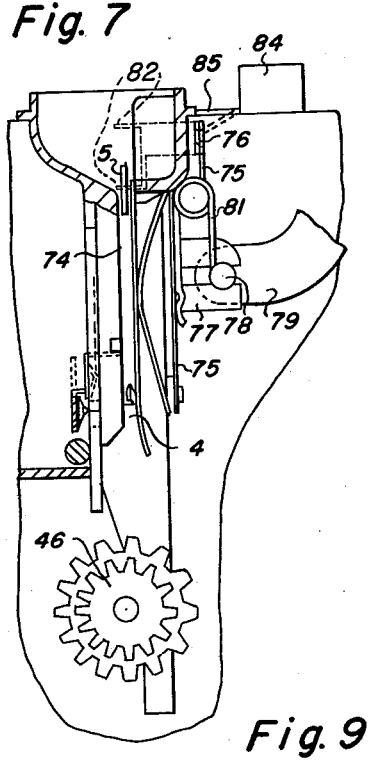
FIG. 7 is a fragmentary side elevation view of the structure of FIG. 6.
Figure 8:
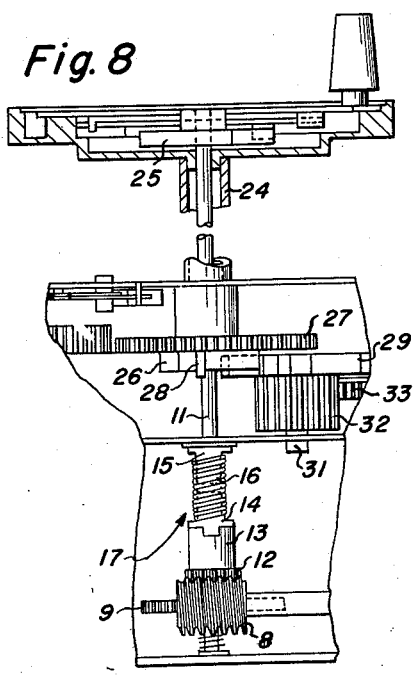
FIG. 8 is a top plan view showing the drive mechanism for advancing the slide magazine.

As is well known in the art, a slide projector generally comprises a housing 1 having a track 2 for slidably supporting a slide magazine 3 as seen in FIG. 3, a lamphouse and a lens system, not shown, for directing the light from the lamphouse along an optic axis, a drive or power means shown in FIGS. 1, 2 and 8 for advancing magazine 3 by incremental distances corresponding to the spacing of successive slide compartments, a slide gate 4 as seen in FIG. 7 disposed along the optic axis for receiving a slide 5, and an elevator mechanism seen in FIGS. 6 and 7 for transporting slides 5 in magazine 3 to and from film gate 4 for viewing.

Referring to FIGS. 1 and 2 and 8, the drive means for slide magazine 3 comprises a motor 6 whose drive shaft 7 has a worm 8 at one end in mesh with a worm gear 9 which rotates freely on shaft 11. A pinion gear 12 and a hub 13, as best seen in FIG. 8, are integral with worm gear 9 and rotate freely on shaft 11. The hub 13 is keyed to a sleeve 14 which rotates freely on shaft 11, and another sleeve 15 in alignment therewith is secured to shaft 11. A coil spring 16 encircles sleeves 14, 15 and has one end secured to sleeve 15, and the other end extending tangentially from sleeve 14. The sleeves 14, 15 and spring 16 form a spring clutch 17 of a well-known type in the art. When the free end of spring 16 is permitted to rotate, spring 16 tightly clamps sleeves 14, 15 together, drivingly connecting motor 6 to shaft 11. When the free end of spring 16 is held stationary, the coils of spring 16 expand and sleeve 14 rotates within the coils and does not drive sleeve 15 and shaft 11.

Figure 4:
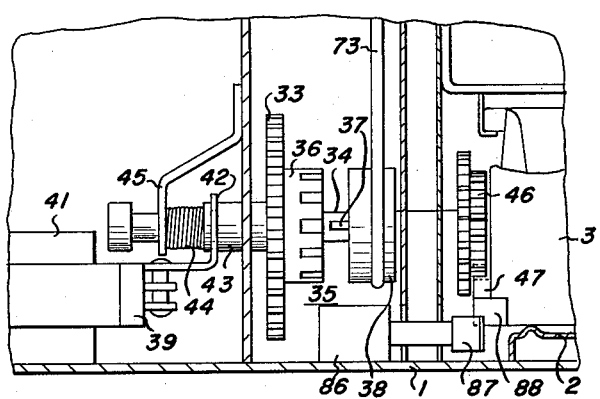
FIG. 4 is a view similar to FIG. 3 showing the clutch in an inoperative position.

The mechanism for selectively holding and releasing the free end of spring 16 comprises an armature plate 18 of an electromagnet 19 having a cut-out portion 21 forming a hook that engages the spring end as seen in FIG. 2 only when armature plate 18 is in its released or counterclockwise position. A spring 22 normally maintains armature plate 18 in its counterclockwise position against a stop 23. When electromagnet 19 is energized, armature plate 18 is moved clockwise against the bias of spring 22 and permits the free end of spring 16 to rotate thereby clamping sleeves 14, 15 together for driving shaft 11. When shaft 11 is driven, it normally drives a shaft 24 as seen in FIG. 8 through another clutch shown generally at 25 and explained in detail in the aforementioned application. A Geneva wheel 26 and a gear 27 are fixed to shaft 24, and a Geneva drive pin 28 is secured to gear 27. The wheel 26 and pin 28 cooperate with a star wheel 29 that is mounted for rotation on a stub shaft 31. A gear 32 integral with star wheel 29 meshes with a gear 33 rotatably mounted on a pinion shaft 34 as best seen in FIGS. 1, 3 and 4. A clutch 35 comprising a multiple tooth hub member 36 integral with gear 33 is adapted to cooperate with a pin 37 formed by a pulley 38 which is secured to shaft 34. An armature 39 of a solenoid 41 has a bifurcated arm 42 received by an annular slot in a hub 43 of gear 33 and is adapted when energized to move gear 33 against the bias of a helical spring 44 encircling shaft 34 and interposed between a flange 45 and hub 43. The shaft 34 is provided at one end with a pinion 46 for drivingly engaging a rack 47 formed by slide magazine 3.

Referring more particularly to FIGS. 1 and 2, pinion gear 12 which is integral with worm gear 9 meshes with a gear 48 that is mounted for free rotation on a shaft 49. A pinion gear 51 is integral with gear 48 and meshes with a gear 52 that is mounted for free rotation and axial movement on a shaft 53. A coil spring 54 is interposed between the hub of gear 52 and a washer 55 which is retained near the free end of shaft 53 by a spring clip 56. A timing wheel 57 is integral with gear 52 and has a flat face 58 cooperating with a rectangular cam 59. The cam 59 is rotatably mounted on a post 61 and has four surfaces adapted to selectively contact the face of timing wheel 57 to cause timing wheel 57 and gear 52 to assume four different axial positions along shaft 53. The spring 54 maintains gear 52 and wheel 57 tightly against the presented edge surface of cam 59 and therefore acts as a detent for holding the rotated setting of cam 59. The timing wheel 57 has four lobes 62, 63, 64 and 65, equally spaced around its periphery. Each lobe 62, 63 extends one predetermined unit of distance from the face of gear 52; lobe 65 has a length of approximately two such units: and lobe 64 has a length of approximately three units. The lobes on wheel 57 are adapted to cooperate with an arm 66 of a switch 67 mounted on a wall 68. When cam 59 is positioned as shown in FIG. 1, it locates timing wheel 57 axially along shaft 53 in such a position that only the two longest lobes 64, 65 engage arm 66 of switch 67. The lobes 64, 65 are diametrically opposed on wheel 57 and therefore a slide changing cycle occurs at two evenly spaced times during one rotation of timing wheel 57. The ratios of the various pairs of gears may be chosen to cause timing wheel 57 to rotate in any desired amount of time. In the projector shown, timing wheel 57 rotates every 16 seconds. Therefore when cam 59 is set as shown in FIG. 1, a slide changing cycle occurs every 8 seconds. By setting cam 59 to one of the other positions, all four lobes on timing wheel 57 are aligned vertically with arm 66 or switch 67 so that each of the lobes initiates a slide changing cycle and one cycle is initiated every four seconds. When cam 59 is set in another position, only the longest lobe 65 of timing wheel 57 engages arm 66 and a slide changing cycle is initiated only once during each rotation of timing wheel 57 or every 16 seconds. Finally, cam 59 may be set in the fourth position where none of the lobes on timing wheel 57 are aligned with arm 66 and no automatic slide changing can occur. This latter position of cam 59 is designated "manual."

The gear 52 which is constantly being driven by drive motor 6 further drives a gear 69 fixed to a shaft 71 as best seen in FIGS. 1 and 2. The shaft 71 is rotatably supported by wall 68 and further has a pulley 72 at one end, mounted for rotation therewith and drivingly connected by a spring belt 73 to pulley 38.

The elevator mechanism as best seen in FIGS. 6 and 7 for lowering a slide holder 74 from gate 4 to magazine 3 and lifting the next slide holder 74 to gate 4 for projection during a slide-changing cycle generally comprises a guiding member 75 for guiding the elevator in a vertical path between magazine 3 and the gate 4, and a lifting member 76 secured to member 75 by rivets 70 for raising and lowering the slide holders 74. An arm 77 having a bifurcated tip projects forward from guiding member 75 and is adapted to receive a stub shaft 78 which is integral with one end of a pivotal elevator lever 79. A hairpin spring 81 is secured between stud shaft 78 and member 75 for maintaining the entire elevator assembly in a vertical plane. The lever 79 is reciprocated by a cam means, not shown, for moving the elevator assembly up and down. The lifting member 76 of the elevator which moves with guiding member 75 has a pair of lifting brackets 82 on each side thereof. The brackets 82 engage lifting ears 83 of slide holders 74 for transferring the slide holders from magazine 3 to the projector gate 4 and vice versa. A normally open switch 84 is mounted on the projector having an arm 85 extending in the path of guiding member 75 and adapted to be engaged thereby for closing switch 84 as the elevator assembly is moved up and clear of magazine 3. The purpose of switch 84 will be explained hereinafter. A more detailed description of the elevator mechanism may be secured from the aforementioned patent application.

Figure 5:
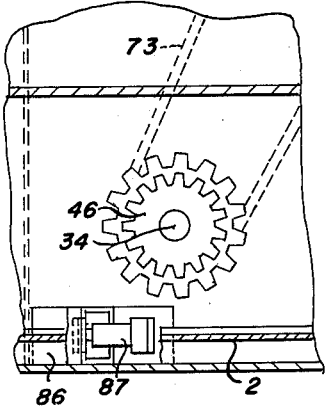
FIG. 5 is a fragmentary side elevation view of the structure of FIG. 4 showing the clutch control switch.
Figure 9:
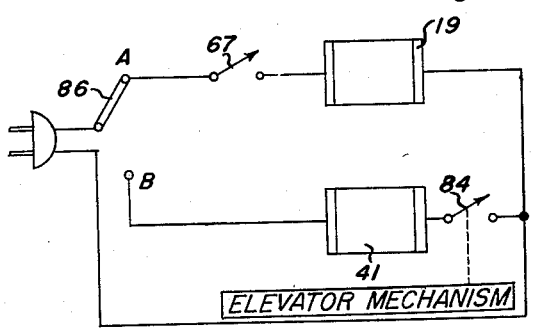
FIG. 9 is a schematic wiring diagram of the electrical circuit adapted for automatically returning the slide magazine to its original starting position after all of the slides have been projected.

A control switch 86 of the toggle type for controlling the rapid return of slide magazine 3 is mounted on the projector frame as best seen in FIGS. 3, 4 and 5 and has an arm interposed between and extending into the path of a pair of projections 88, only one of which is shown, secured to opposite ends of magazine 3. The switch 86 is properly positioned with respect to the magazine 3 so that advancement of magazine 3 a distance of one slide compartment after the last slide has been returned to magazine 3 from the viewing position causes the projection secured to the back end of magazine 3 to engage arm 87 and move switch 86 from position A to position B as seen in FIG. 9. During the normal advance of magazine 3, one compartment at a time for successively projecting the slides 5, arm 87 of switch 86 is in position A. Movement of arm 87 into position B electrically connects the power supply to solenoid 41 and elevator switch 84, which is normally in the open position and is closed only when the elevator mechanism is clear of slide magazine 3. As soon as the elevator mechanism moves clear of slide magazine 3, switch 84 is closed completing the circuit and causing solenoid 41 to operate. As soon as hub 36 is disengaged from pulley 38, another power means including the spring belt 73, which is constantly rotating during the operation of the projector, drives pulley 38, shaft 34 and pinion gear 46 in the opposite direction of its normal direction of rotation thereby rapidly returning slide magazine 3 to its original starting position. When magazine 3 arrives at its original starting position, projection 88 secured to the front end of magazine 3 engages arm 87 and returns switch 86 to position A. The solenoid 41 is immediately de-energized, and spring 44 urges hub 36 into engagement with pulley 38 as seen in FIG. 3. The switch 86 in position A connects the power supply to switch 67 which is connected in series with electro-magnet 19. With switch 86 in the A position, each time switch 67 is closed by timing wheel 57, electromagnet 19 is energized releasing spring 16 of clutch 17 for drivingly connecting drive motor 6 to shaft 11 for rotating pinion 46 through clutch 17, Geneva wheel 26, drive pin 28, star wheel 29, gears 32, 33, clutch 35, and shaft 34. The pinion 46 is rotated through an angle sufficient to advance slide magazine 3 a distance of one slide compartment. This same operation is repeated until all the slides 5 have been projected and magazine projection 88 moves arm 87 and switch 86 into position B. During this entire operation of cyclically advancing slide magazine 3 by short incremental distances, pulley 72 and spring-belt 73 are driven with spring belt 73 slipping on pulley 38. The only time spring belt 73 drives pulley 38 and pinion 46 for returning slide magazine 3 to its original starting position is when clutch 35 is disengaged. Spring belt 73 slips on pulley 38 during the normal slide projecting operation of the projector because Geneva wheel 26, star wheel 29, gears 32, 33 and clutch 35 alternately lock and drive shaft 34 and pinion 46 in opposition to the torque developed by belt 73. Since the torque is insufficient to drive pulley 38, belt 73 merely slips thereon.

The invention has been described in detail with particular reference to preferred embodiments thereof, but it will be understood that variations and modifications can be effected within the spirit and scope of the invention as described hereinabove and as defined in the appended claims.

I claim:

1. In a device for viewing photographic slides carried in a moveably mounted magazine, an arrangement for moving the magazine in one direction from a starting position during a viewing cycle and returning the magazine to a starting position at the conclusion of the viewing cycle, said arrangement comprising first power means for moving the magazine during said viewing cycle, second power means for returning the magazine to the starting position, means common to both said power means for transmitting motion to said magazine, and means for disabling the said first power means and rendering operative the second power means, said disabling means comprising a solenoid-operated clutch, and a switch controlling said solenoid and operated by said magazine upon reaching the end of the viewing cycle.

2. In a device for viewing photographic slides carried in a moveably mounted magazine, an arrangement for moving the magazine in one direction from a starting position during a viewing cycle and returning the magazine to the starting position at the conclusion of the viewing cycle, said arrangement comprising first power means for moving the magazine during said viewing cycle, second power means for returning the magazine to the starting position, means common to both said power means for transmitting motion to said magazine, said first and second power means further simultaneously transmitting driving forces to said common means, positive drive means connecting said first power means and said common means, and friction drive means connecting said second power means and said common means, the driving force of the first power means being sufficient to overcome the driving force of the second power means, and means for disabling the said first power means and rendering operative the second power means, at the conclusion of the viewing cycle.

3. An arrangement according to claim 2, said friction drive means comprising belt and pulley means.

4. An arrangement according to claim 2 wherein said friction drive means includes a cylindrical member frictionally engaged by a drive belt, said cylindrical member being part of said common means.

5. In a device for viewing photographic slides carried in a moveably mounted magazine, an arrangement for moving the magazine in one direction from a starting position during a viewing cycle and returning the magazine to the starting position at the conclusion of the viewing cycle, said arrangement comprising first power means for moving the magazine during said viewing cycle, second power means for returning the magazine to the starting position, said first and second power means simultaneously transmitting driving forces to said magazine, positive drive means connecting said first power means and said magazine, and friction drive means connecting said second power means and said magazine, the driving force of the first power means being sufficient to overcome the driving force of the second power means, and means for disabling the said first power means and rendering operative the second power means at the conclusion of the viewing cycle.

6. An arrangement according to claim 5, said last-named means comprising a positive-drive clutch mechanism.

7. An arrangement according to claim 5, said last-named means comprising an electrically operable positive-drive clutch mechanism.

8. An arrangement according to claim 5, slide-handling means for removing and returning slides from and to said magazine for viewing purposes, and interlock means coordinating operation of said slide-handling means and said disabling means.

9. An arrangement according to claim 5, slide-handling means for removing and returning slides from and to said magazine for viewing purposes, an electrically operable positive-drive clutch mechanism forming part of said disabling means, and means controlled by said slide-handling mechanism for controlling said disabling means to assure that return movement of the magazine occurs only when said handling means is in a predetermined condition.

10. An arrangement according to claim 9 wherein said disabling means comprising a solenoid-operated clutch mechanism and a control circuit for the solenoid, said means controlled by the slide-handling mechanism comprising an electric switch in said control circuit.

References Cited in the file of this patent

UNITED STATES PATENTS

| | | |
|---|---|---|
| 775,963 | Bentzon | Nov. 29, 1904 |
| 2,401,506 | Pechkranz | June 4, 1946 |

FOREIGN PATENTS

| | | |
|---|---|---|
| 493,832 | Germany | Mar. 13, 1930 |